United States Patent [19]

Pirce

[11] Patent Number: 4,868,994
[45] Date of Patent: Sep. 26, 1989

[54] METHOD AND EQUIPMENT FOR DETERMINING TOOL OFFSETS FROM A REFERENCE POSITION

[76] Inventor: Kent H. Pirce, 0-321 Ransom St., Grandville, Mich. 49418

[21] Appl. No.: 223,410

[22] Filed: Jul. 25, 1988

[51] Int. Cl.⁴ ............................................. B27G 23/00
[52] U.S. Cl. ....................................... 33/636; 33/639; 33/628
[58] Field of Search ................. 33/639, 642, 636, 633, 33/628, 626, 568, 570; 408/110

[56] References Cited

U.S. PATENT DOCUMENTS 4,329,785  5/1982  Peterson .................................. 33/628

Primary Examiner—Harry N. Haroian
Attorney, Agent, or Firm—Waters, Morse & Harrington

[57] ABSTRACT

The location of the point of a cutting tool with respect to a known reference on a rotatable tool turret is determined preferably with the tool extended in a direction 90° displaced from the cutting position. A reference grid plate is secured in a calibrated position to the carriage on which the turret is mounted. The measuring position of the tool overhangs the grid plate, and an indicator detects the position of the tool point over the measuring grid.

19 Claims, 7 Drawing Sheets

METHOD AND EQUIPMENT FOR DETERMINING TOOL OFFSETS FROM A REFERENCE POSITION

BACKGROUND OF THE INVENTION

Operations performed on machines similar in principle to a lathe have been automated to the extent that a complete series of cuts can be performed without the operator's attention, after the machine has been properly prepared. The control systems have been based usually on perforated or magnetically recorded tapes, or by direct computer programming. A common example of such a machine in a modern shop is the chucking machine, in which bar stock or blanks are rotatively machined according to specifications. These machines are often referred to as "NC" (numerically controlled), or "CNC" (computer numerically controlled). Essentially, these machines consist of a heavy frame supporting a rotating spindle, and providing a guideway on which a carriage moves axially with respect to the spindle. The carriage sometimes has a transverse guideway engaging a cross-slide carrying the turret, which can be angularly indexed about its axis (usually vertical) to present different tools in sequence to the workpiece. The control system is responsible for determining all of these movements.

The control system "knows" the position of a reference surface on the turret, but does not initially "know" where the cutting point of each tool is with respect to such a reference. These tools can be for specialized lathe turning, or for drilling, boring, threading, or any other standard operation. In order for the automatic control system to function, the displacement of the cutting point from the reference must be determined, and this information must be inserted in the control system. The standard procedure to accomplish this is to "touch off" each tool against a reference piece held in the chuck, either visually, or by the use of a light controlled by contact of the tool with the surface of the reference piece. This is very time-consuming, and requires the attention of a very highly skilled operator. Determining this data on one widely used machine requires 50 to 55 steps for each tool carried by the turret. All of this represents shop time in which the expenses are on-going, an the machine is out of production. The present invention is directed at providing equipment and procedure that will simplify this work, and render it much more efficient.

SUMMARY OF THE INVENTION

The cutting point of a tool is located with reference to a known position on the adjacent turret face by locating the tool point with respect to a grid plate temporarily attached to the carriage of the machine on which the turret is mounted. The grid plate is positioned preferably at the operator's side of the carriage, and measurements are then taken in directions 90 degrees displaced from those of the cutting position of the tool. This results in the tool overhanging the grid plate. A detector block is placed on the grid plate, with a key engaging a groove of the grid oriented in the direction of measurement, and the block is slid gently up to contact with the tool point. A bar with its own key is engaged with the nearest grid groove perpendicular to the direction of measurement, and an indicating plunger is extended to give the distance from the block to the bar. The tool position is the sum of the labeled groove on the plate, plus the indicator reading. The position of the grid plate itself is calibrated by the same system, noting the position of the plate with respect to a mark on the turret face. Auxiliary devices are included for situations where it is necessary to reach from remote indicator positions because of obstructions possibly from adjacent tools in the turret. This procedure is essentially duplicated for determining measurements corresponding to distances parallel to the spindle axis and transversely.

DESCRIPTION OF THE PREFERRED EMBODIMENTS

Figure 1:
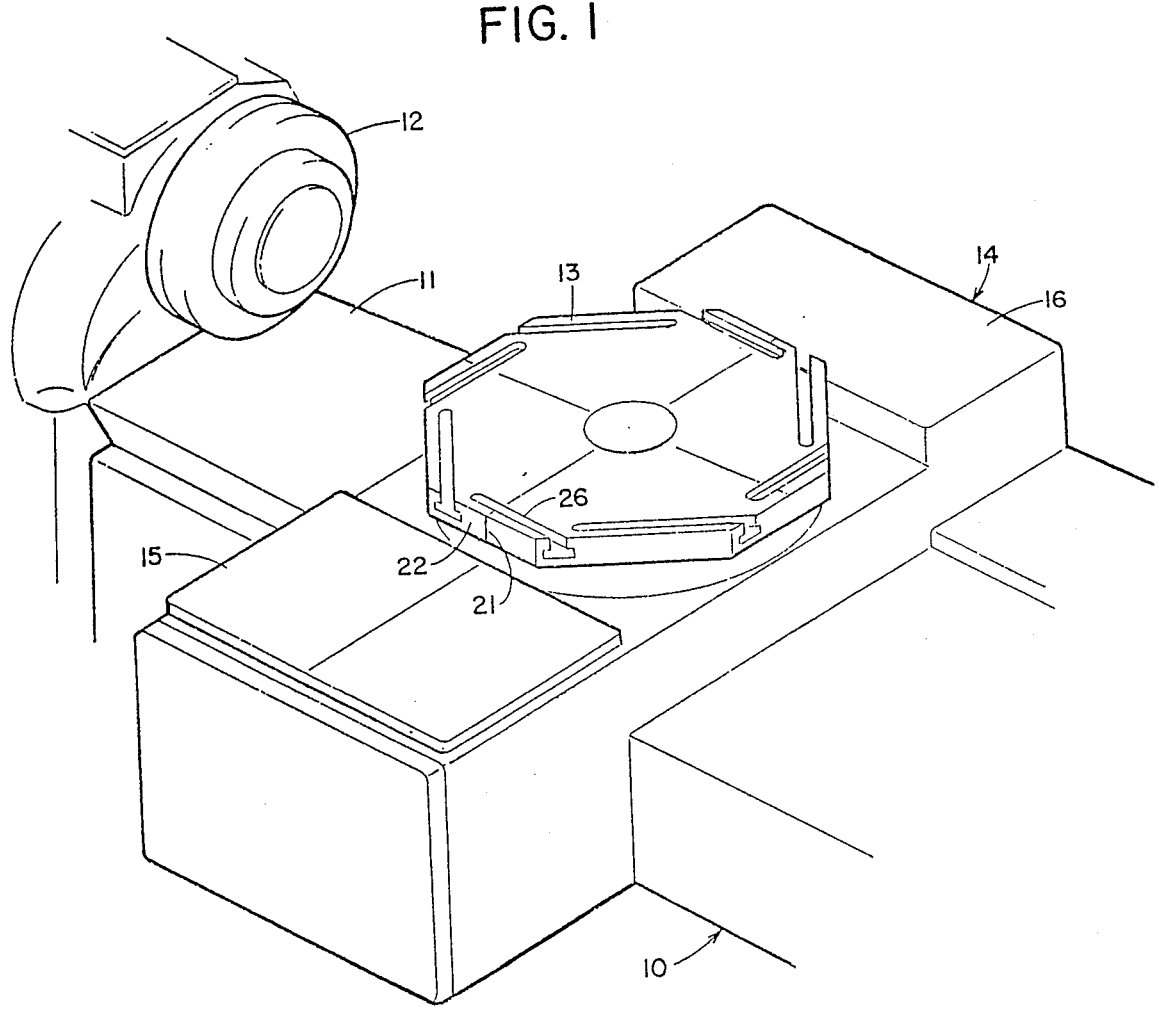
FIG. 1 is a perspective view of the central portion of a standard chucking machine.
Figure 2:
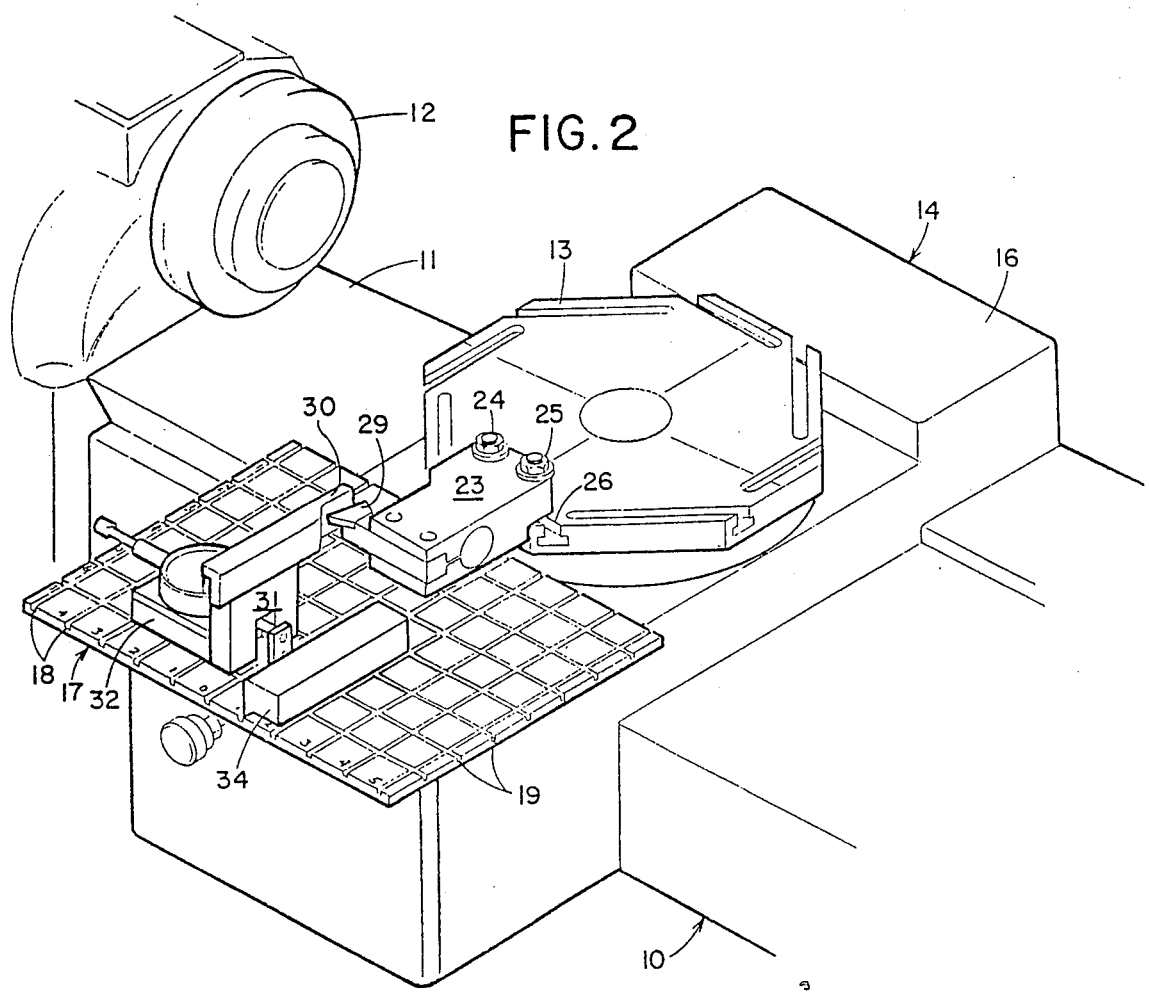
FIG. 2 is view similar to FIG. 1, showing the addition of equipment used for locating the position of the point of a cutting tool with respect to the turret of the machine.
Figures 11, 12:
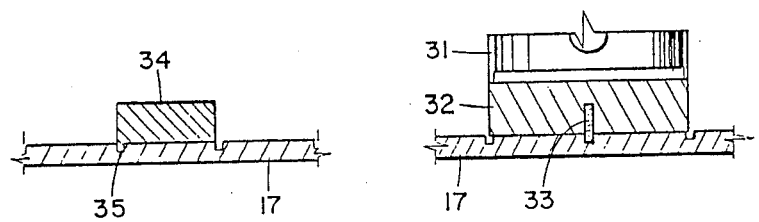
FIG. 11 is a sectional view on an enlarged scale through the grid plate and the measuring bar.
FIG. 12 is a sectional view on an enlarged scale through the grid plate and the base of the detector block, showing the key spline engaging a groove in the grid plate.
Figure 3:
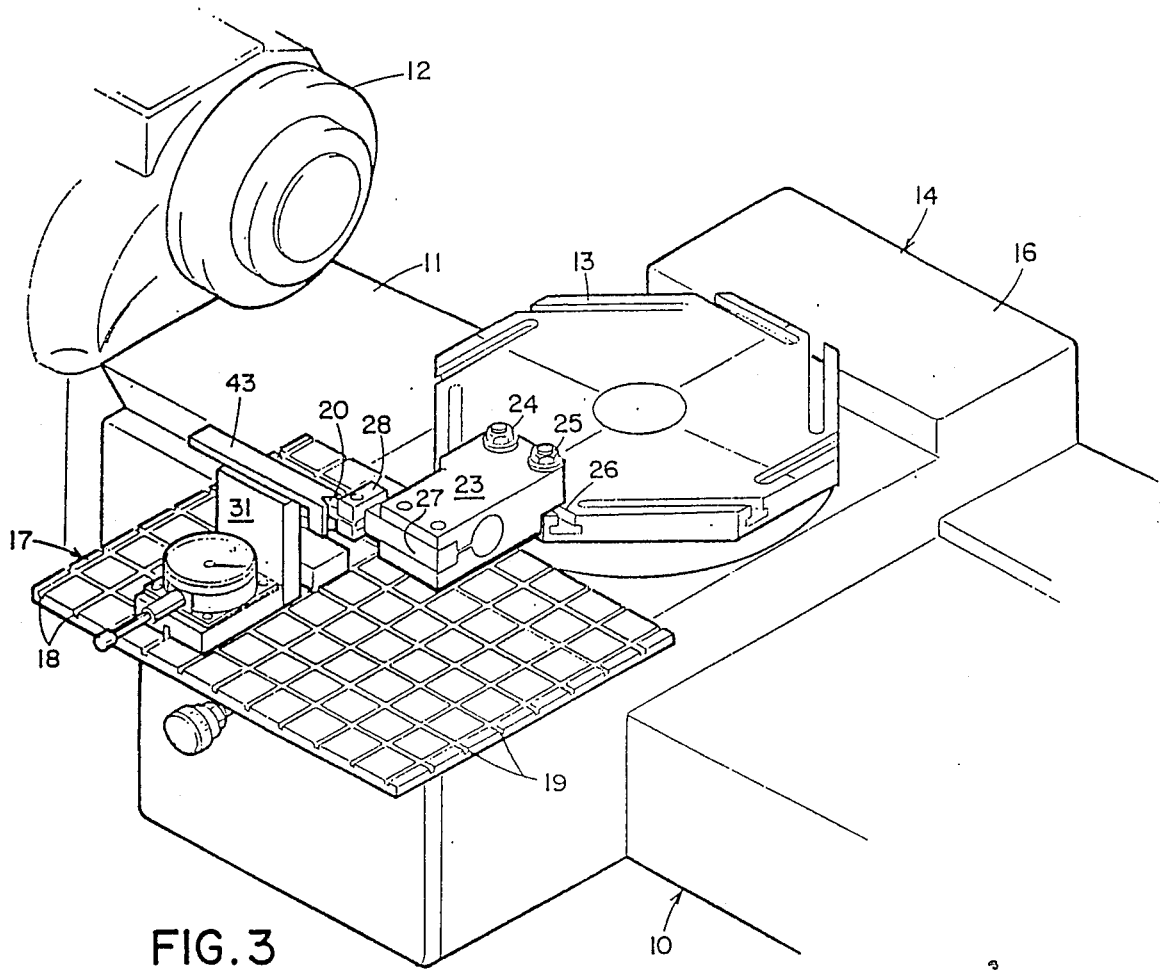
FIG. 3 is a view similar to FIG. 2, showing a measurement to a different form of cutting tool.
Figure 4:
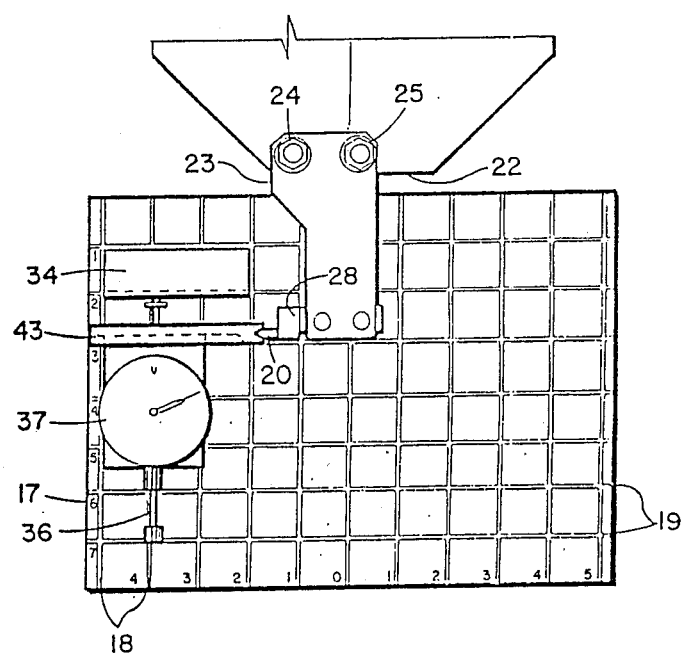
FIG. 4 is a top view with respect to FIG. 3.

The machine shown in FIGS. 1-3 includes a main frame indicated generally at 10, which provides a guideway 11 and conventional bearings (not shown) supporting a spindle carrying the chuck or collet 12 that holds work pieces as they are rotated against the action of tools mounted on the turret 13. The turret is mounted on the carriage 14, which rides along the guideway 11, and may incorporate a transverse guideway and cross-slide on which the turret 13 would be mounted. The carriage includes the cover plates 15 and 16 which are secured in predetermined position with respect to the remainder of the carriage structure. The reference grid plate 17 is mounted on the cover plate 15 on the operator's side of the machine. This plate carries a series of grooves 18 extending transversely with respect to the guideway 11, and the second series of grooves 19 intersecting and perpendicular to the grooves 18, and thus parallel to the guideway 11. The walls of these grooves form reference abutments providing a base from which measurements can be taken. These measurements establish the relationship between the tip of the tool 20 and the reference groove 21 on the face 22 of the turret 13 (refer to FIG. 1). The standard automatic control system (not shown) of the machine "knows" the exact location of the reference line 21, but the tool 20 is held in a position considerably removed from that point. The tool is supported by a conventional structure which includes the carrying block 23 held in place by the bolts 24 and 25 having heads riding in the T-slot 26. The block 23 carries a bar 27 supporting a clamp 28 which holds the tool 20 in position. This structure is shown in FIGS. 3 and 4. In FIG. 2, the block 23 supports the tool 29 directly.

The grooves 18 are labelled along the edge of the plate nearest to the operator in series from a central groove labelled "0", with numbers increasing in both directions. Preferably, these grooves are one inch apart. When the plate is properly positioned on the cover plate 15 of the machine, the left wall of the "0" groove is in direct alignment with the rotational axis of the turret 13. The left wall of the other grooves 18 form the reference abutment surfaces also. The front walls of the grooves 19 (the walls nearest to the operator) provide similar reference abutments for measurements taken toward and away from the turret. These distances are labeled along the left margin of the plate 17, as shown in FIG. 4.

It should be noted that the placement of the plate 17 at the operator's side of the machine certainly provides the most convenient location for taking measurements. These measurements, however, are rotated 90° about the axis of turret from the direction of the measurements associated with the working position of the tool. In other words, the measurements being taken as appearing in FIG. 2 show the cutting tool in a position rotated 90° in a counter-clockwise direction, as viewed from above, with respect to the axis of the turret 13. To get the tool back into cutting position, the turret would be indexed (rotated) 90° clockwise for engagement with the workpiece held by the chuck 12. Measurements taken in the FIG. 2 position in the direction toward and away from the turret 13 correspond to distances parallel to the axis of the rotation of the chuck 12, when the tool is in working position. Measurements taken in the left-right direction, as viewed in FIG. 2, correspond to the relationship of the tool toward and away from the axis of rotation of a chuck when the tool is in working position.

The taking of measurements which establish the relationship between the cutting point of the tool and the reference line 21 at the face of the turret can be made in a variety of ways, depending upon the configuration of the tool, and whether or not access to it is to some extent limited by the presence of adjacent tools mounted on the turret. These additional tools are not shown on the drawings, but may be of almost any imaginable configuration, because special mounting structure might be necessary. In FIG. 2, the edge of the tool 29 is detected by the feeler bar 30 held against the right vertical face of the angle block 31, as shown in FIG. 2.

Figure 10:
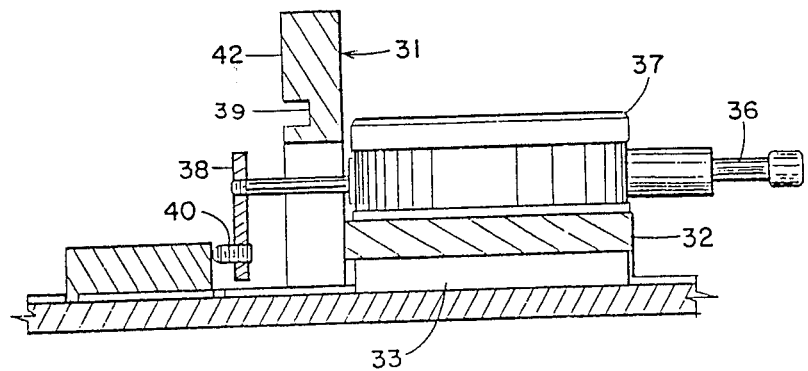
FIG. 10 is a view on an enlarged scale of the detector block and indicator, shown in vertical section in position for taking measurements to the right of the "0" reference on the grid plate.

The angle block is a necessary part of the detector assembly, and the base 32 has a groove receiving a key spline 33 having a fairly close sliding fit with either the grooves 18 or 19. As shown in FIG. 2, the engagement of the spline with one of the grooves 19 orients the right face of the angle block in a plane perpendicular to the axis of rotation of the spindle 12, and parallel to the plane of the rotational axis of the turret 13. Holding the bar 30 firmly against the right face of the angle block 31, the block is slid gently along the groove until the bar 30 is in contact with the tool 29. It now becomes necessary to determine the position of the angle block, and this is done with reference to the grid plate 17. As shown in FIG. 2, the right face of the angle block 31 is somewhat to the left of the "0" groove, and this distance is obtained by detecting the distance between the right face and the "0" groove. In FIG. 2, the bar 34 is engaged with the next groove to the right, for clarity of illustration. The indicator reading would thus be an inch greater than the actual distance of the block 31 from the "0" reference. Normally, the bar would be engaged in the "0" groove. The bar 34 has a lip 35 engageable with any one of the grooves 18 or 19. The distance is obtained by extending the plunger 36 of the indicator 37 mounted on the base 32 of the angle block. FIG. 10 shows the method of determining measurements to the right of the "0" groove. Notice that the position of the bar has the lip on the left side. The right edge of the bar is then coplanar with the left wall of the "0" groove. The left-hand extremity of the plunger 36 is provided with an adapter including the arm 38 extending downward from the plunger 36, and preferably secured by a device known as a Helicoil (not shown) to provide solid support for the adjustable abutment screw 40 preferably locked in position by a similar Helicoil. The screw 40 is adjusted so that the retracted position of the plunger 36 (corresponding to 0 reading) places the tip of the abutment 40 in coplanar relationship with the left surface 42 of the angle block. The extension of the plunger to contact with the bar 34 will thus read the distance between the face 42 and the right edge of the bar 34. In making these measurements, some gentle pressure is best applied to the bar 34 to keep it pressed against the reference wall of the groove.

Measurement toward and away from the turret, in the measuring position of the tool, are taken as shown in FIGS. 3 and 4, which illustrate a different form of feeler bar adapted to engage a tool having a different tip configuration. The feeler bar 43 has an L-shaped configuration over most of its length, with the top flange riding on the top of the detector block 31, or in the groove 39 parallel to it in the face 42 of the block. The right-hand extremity of the bar 43 is rectangular in cross section, and is provided with a V slot for engagement with the similarly shaped tip of the tool 20, which is of the type commonly used for threading or grooving. With the vertical flange of the bar 43 pressed gently against the surface 42 of the detector block, the block is slid over the surface of the plate 17, with the key 33 engaging one of the grooves 18. The position at which the slot in the end of the bar 43 is in best engagement with the tool 20 is the position corresponding to the measurement, as the apex of the slot is coplanar with the surface of the bar 43 that bears against the surface 42 of the detector block. The bar 34 is then engaged with the next groove 19, and measurements taken with the indicator giving the distance from the face 42 over to the reference groove. In this case, the indicator reading is then added to the groove label to give the distance of the tool tip over to the face 22 of the turret.

Figure 5:
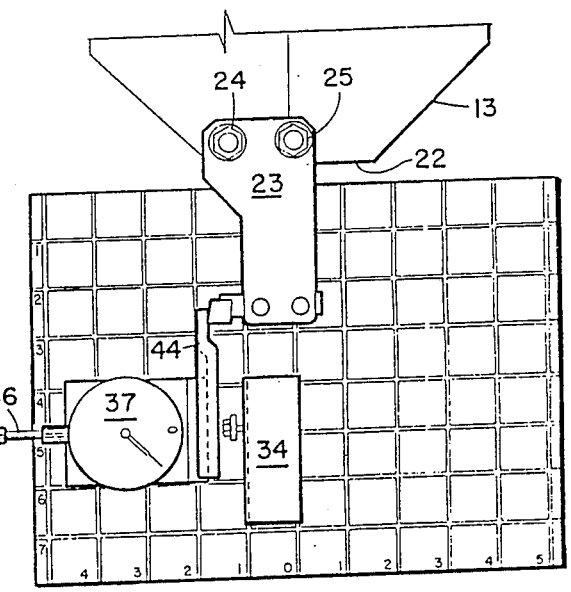
FIG. 5 is a top view showing a modified form of position detector.
Figure 6:
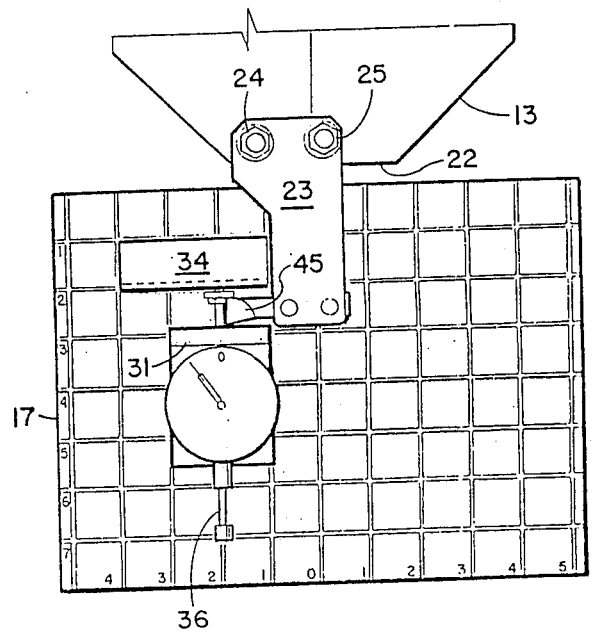
FIG. 6 is a top view showing a different type of measurement associated with a particular form of cutting tool.
Figure 7:
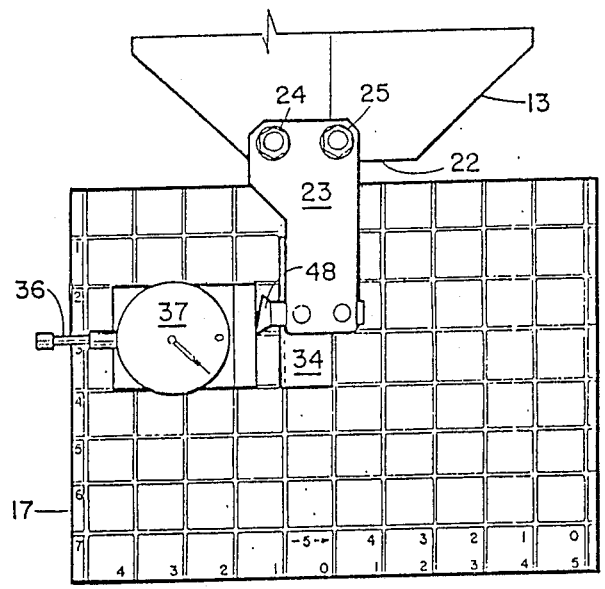
FIG. 7 is a top view showing a measurement to a particular tool configuration.

In FIG. 5, the right-left measurement is taken through the use of a different form of bar, indicated at 44. This bar also has a "L-shaped" configuration over most of its length, with the top flange riding on the top of the detector block 31, or in the groove in the face of the block. The end, however, is offset to provide a contacting surface coplanar with the surface 42 of the detector. The resulting placement of the detector block is taken as previously described. In FIG. 6, the tool 45 is shown exposed in a position such that the detector block can be slid directly into engagement with the cutting point. A feeler bar is thus not necessary. The location with respect to the grid plate is read as before. FIG. 7 shows another example in which this is possible with respect to the right-left measurement. The detector block is slid gently until the surface 42 is in contact with the tip of the tool 48, and its position read with respect to the grid plate.

Figure 8:
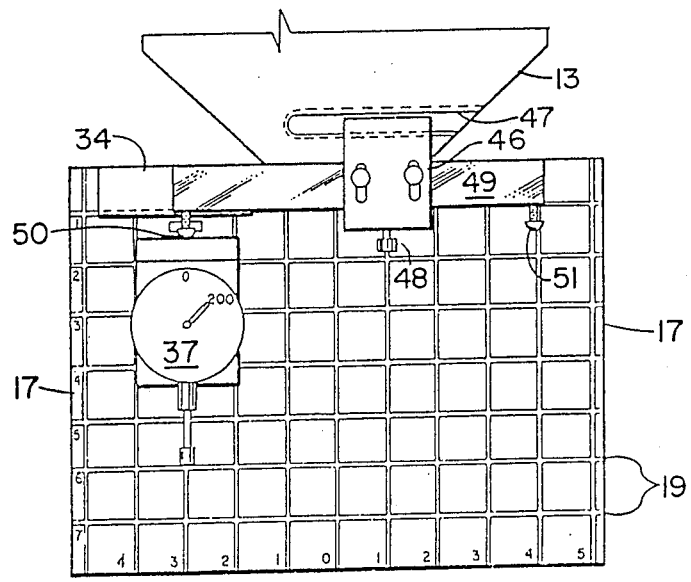
FIG. 8 is a top view showing the first step in the calibration of the position of the grid plate with respect to the turret.
Figure 9:
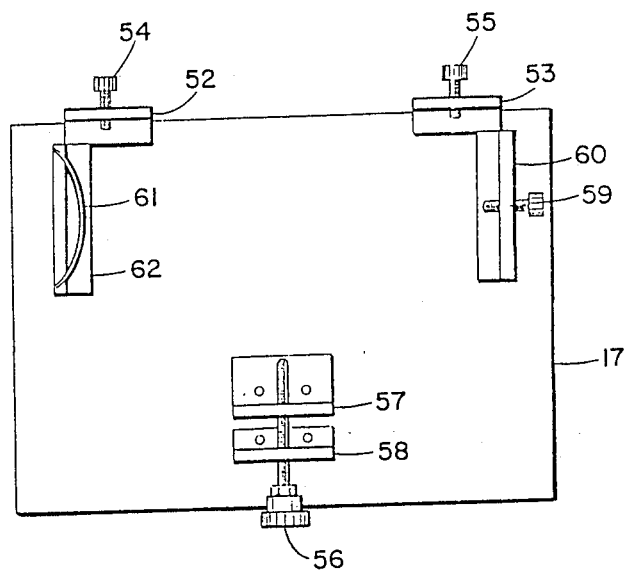
FIG. 9 is a view of the underside of the grid plate, showing the arrangement for securing it to the cover plate of the machine carriage.
Figure 14:
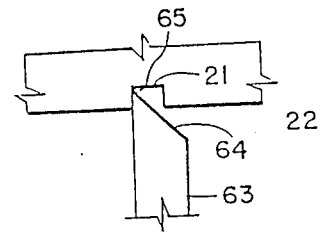
FIG. 14 is a fragmentary view from above on an enlarged scale, showing the arrangement for detecting the position of the reference groove on the turret.
Figure 15:
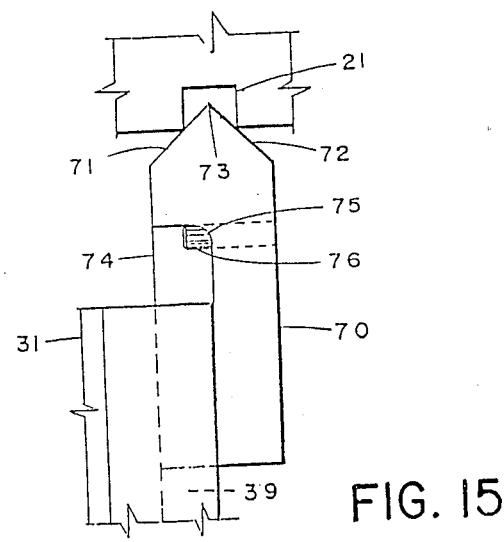
FIG. 15 shows a modified form of the invention for detecting the position of the reference groove.

FIGS. 8 and 9 illustrate the arrangement for calibrating the position of the grid plate with respect to the turret. A channel-shaped clamp 46 has one flange engaging the T-slot 47 on the turret. The opposite flange is threaded to receive a screw 48, which clamps the calibrating bar 49 solidly against the face of the turret. The screws 50 and 51 provide adjustable reference abutments that can be contacted by the face 42 of the detector block. The lateral spacing of these abutments makes it possible to assure the parallelism between the grooves 19 and the face of the turret, and to determine the distance of the grid in a direction toward and away from the turret axis. Preferably, the screws 50 and 51 are set so that the indicator reading to the bar 34 engaging the first of the grooves 19 will produce a reading of 0.200 inches. The distance across the width of the calibrating bar 49, plus the projecting height of the screws 50 and 51, is set previously with a micrometer at 1.200". If this reading does not appear at both screws, the locating system shown in FIG. 9 on the underside of the plate 17 must be adjusted. The angle brackets 52 and 53 have one leg secured to the underside of the plate 17, and the vertical leg provided with a threaded hole receiving the adjusting screws 54 and 55. The clamping screw 56 traverses the brackets 57 and 58, and the lateral adjustment screw 59 traverses the bracket 60. All of these brackets are secured solidly to the plate 17. The adjustment screws 54 and 55 engage the edge of the cover plate 15 of the machine at its inner edge, with the clamping screw 56 engaging the outer edge of the plate. A spring abutment 61 is mounted on the bracket 62, so that the left and right edges of the plate 15, as shown in FIG. 1, are received between the spring abutment 61 and the end of the adjusting screw 59. Tightening or loosening the adjusting screws 54 and 55 will adjust the distance of the grid plate 17 toward and away from the turret, and the adjusting screw 59 will move the plate in conjunction with the spring abutment 61 in the left-right direction. This latter placement, so that the reference wall of the "0" groove corresponds to the rotational axis of the turret, is determined by the use of a detector block and grid bar in the same manner as the other measurements, with the spline of the detector block engaging one of the grooves 19. The location with reference to the groove mark 21 on the turret face (refer to FIG. 1) is best determined as shown in FIG. 14, if the reference is the left wall of the groove. The feeler bar 63 is placed with its left-hand surface (as viewed in FIG. 14) against the surface 42 of the detector block, with the bevelled end 64 reaching into the groove 21 to engage the sidewall 65 of the groove, which is in direct alignment with the axis of the turret in the measuring position. The groove 21 (the reference mark shown in FIG. 1) is best made with a flat bottom in the machine as manufactured, so that the measurement may not be complicated by engaging a radius surface at an indeterminate point. With the measurement taken as shown in FIG. 14, even a small radius at the end of the feeler bar will not affect the validity of the reading. Where the reference is to the center of the groove, the arrangement shown in FIG. 15 is used. The feeler bar 70 has a pointed end, with the surfaces 71 and 72 meeting at the apex 73 which is coplanar with the reference surface of the detector block. The surfaces 71 and 72 make equal angles to this plane. FIG. 15 shows the flange 74 received in the groove 39 in the block 31. The formation of the flange 74 involves a milling operation leaving the radius at 75. To prevent this radius from riding up on the edge of the detector block, and distorting the measurement, the pin 76 is pressed into an appropriate hole in the bar 70. The pin forms an abutment encountered by the edge of the block before it can engage the curved surface.

Figure 13:
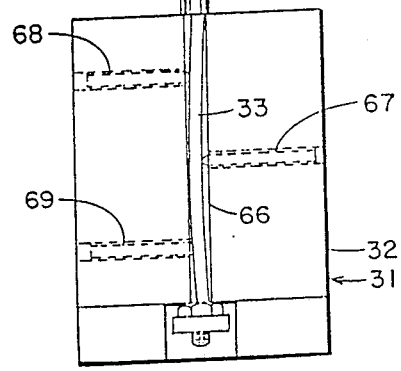
FIG. 13 is a bottom view of the detector block, showing a key spline with induced curvature.

It is obvious that the use of a feeler bar extending the plane of the surface 42 of the detector block requires that the rotation of the detector block with respect to the plate 17, while the key spline is engaged with one of the grooves, be kept to an absolute minimum. Any such rotation will swing the feeler bar along with it, and distort the reading. Since it is desirable to keep these readings accurate to within a thousandth of an inch, it may be desirable to use the arrangements shown in FIG. 13 for adjusting the effective width of the spline rather than maintaining excessively close tolerances between the width of the grooves and the width of the spline. FIG. 13 shows a flexible spline 33 received within a somewhat wider slot 66 in the base 32 of the block 31. A set screw 67 is mounted centrally along the slot 66, and bears against the central portion of the spline. The set screws 68 and 69 are disposed to bear against the spline at positions near the opposite ends. Appropriate adjustments of these three set screws will induce a degree of curvature in the spline 33 to establish three points of contact such that the central one is adjustable toward and away from the contact of the spline at its opposite ends in the grooves. With this adjustment, it is thus possible to increase the effective width of the spline and remove any looseness in its engagement with the grooves. Care must be taken in making this adjustment, however, so that the orientation of the face 42 is not angularly displaced. This can normally be accomplished by adjusting the screws 68 and 69 so that the spline maintains contact with the opposite wall of the slot 66, with the central screw 67 then being adjusted to obtain the necessary curvature.

Figure 16:
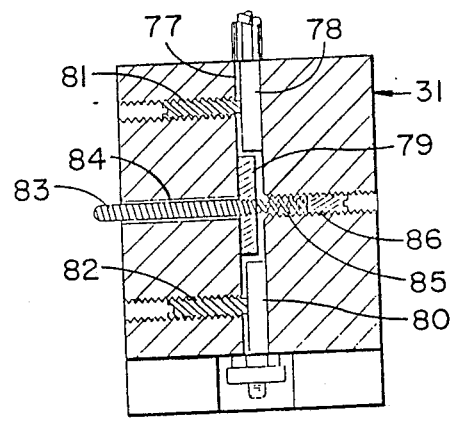
FIG. 16 shows a modified arrangement for providing a variable-width key spline.

FIG. 16 shows a modified arrangement for providing a variable-width key spline. The base of the block 31 has a groove 77 that is 0.010" to 0.020" wider than the short key segments 78-80. the segments 78 and 80 are held solidly against the right-hand wall of the groove 77, as viewed in FIG. 16, by the screws 81 and 82, respectively. The central segment 79 is carried on a short guide rod 83 sliding freely in the hole 84. The rod is fixed with respect to the segment 79 by a tight threaded engagement. A spring 85 is backed by the screw 86, and bears against the right side of the segment 79. The rod 83 projects slightly from the hole 84 to form a button that can be pressed to move the segment 79 to the right to permit entrance into one of the grid plate grooves. On release of the pressure, the spring 85 causes a gentle biasing action urging the segment 79 to the left to remove any looseness between the block and the groove. The central segment 79 can also be moved against the spring 85 by engaging the segment 79 with the groove first as side pressure on the block moves the segment inward enough to engage the other segments in the groove. The FIG. 16 system has the advantage over that shown in FIG. 13 of providing line contact with the groove walls, rather than at isolated points. In FIG. 16, the possibility of misalignment by improper screw adjustment is removed.

I claim:

1. For use in combination with a cutting machine having a frame providing guideway means, said machine also having at least one spindle rotatably mounted in said frame on a spindle axis, a carriage movably mounted on said guideway means, said carriage including a turret, control means for said carriage, cutting tool means carried by said turret, said cutting tool means having a cutting point, and drive means for said machine, a system for determining the position of said cutting point with respect to said turret wherein the improvement comprises:

a reference plate engageable with said carriage in predetermined relationship therewith, said reference plate providing at least one abutment having a surface disposed at a predetermined distance from a reference point on said turret; and detector means engageable with said plate and with said cutting point, and adapted to detect the relationship between said cutting point and said abutment in a selected direction.

2. A system as defined in claim 1, wherein said reference plate provides a series of parallel abutments, and said detector means includes an indicator having a range at least equal to the distance between said parallel abutments.

3. A system as defined in claim 2, wherein said reference plate has a grid of parallel abutments formed by grooves in said plate, said detector means having means adapted to engage a selected one of said grooves.

4. A system as defined in claim 3, wherein said detector means includes a block having a groove in one face, and said groove engaging means is a flexible key spline received in said groove and extending therefrom beyond said face, and said block has means adapted to induce curvature in said spline.

5. A system as defined in claim 3, wherein said detector means includes an angle block providing one face having said groove-engaging means, and a face perpendicular thereto, and also includes a bar providing groove-engaging means, said indicator being adapted to register the distance from said perpendicular face to said bar when said bar is in engagement with a groove parallel to said perpendicular face.

6. A system as defined in claim 5, wherein said detector means includes a feeler bar engageable with said perpendicular face, and having an end providing a contact configuration coplanar with said perpendicular face.

7. A system as defined in claim 1, further including calibrating means adapted to adjust the position of said reference plate with respect to a reference point on said turret.

8. A method of determining the position of the point of a cutting tool with respect to a reference point on a tool-carrying structure, said method comprising:

installing a reference plate on said tool-carrying structure, said plate having abutment means disposed at a predetermined distance from said reference point; and measuring the distance from said tool point to said abutment means in a selected direction.

9. A method as defined in claim 8, wherein said tool-carrying structure includes a rotatable turret, and measurements relating to the position of said cutting tool are taken in a direction angularly displaced from the working position of said tool by rotating said turret to place said tool in said angularly-displaced position, and measuring in a direction corresponding to said angular displacement.

10. A method of calibrating the position of a reference grid plate with respect to a reference mark on a turret face, comprising:

mounting said grid plate on a member fixed with respect to the axis of said turret, in a plane perpendicular to said axis;

clamping a calibration bar to a face of said turret opposite said plate;

measuring the distance from spaced positions on said calibration bar horizontally to a selected grid reference;

adjusting spaced locating abutments on said plate to render said selected grid reference parallel to said calibration bar, and at a predetermined distance therefrom;

measuring the distance from a selected grid reference perpendicular to said first selected grid reference horizontally to said turret face reference mark; and adjusting a further locating abutment on said plate to reduce to zero said last measurement.

11. A method as defined in claim 10, wherein said measurements are taken from a face of a block having a key engageable with said grid references.

12. A method as defined in claim 11, wherein said measurements include a measurement from a bar having a key engaging a selected grid reference.

13. A method as defined in claim 11, wherein said last measurement is taken from a position of said block face by extending a feeler bar from said face to said turret face reference, said feeler bar having a tip edge coplanar with said block face.

14. A method as defined in claim 10, wherein said calibration bar has adjustable projections providing said spaced positions.

15. An interrelated set of measuring devices, comprising:

a grid plate having mutually perpendicular sets of spaced grooves, said grooves within each of said sets being disposed at predetermined distances therebetween, said plate having reference abutment means adapted to establish a dimensional relationship to equipment to be measured;

a bar having a ridge adapted to engage said grooves;

a detector block having a bottom face provided with a key ridge adapted to engage said grooves, and having a detecting face perpendicular to said bottom face and said key ridge; and indicator means adapted to register the distance between said detecting face and said bar.

16. A set of devices as defined in claim 15, wherein said bar has a width equal to the distance between said grooves, and one edge of said bar is coplanar with an edge of said bar ridge.

17. A set of devices as defined in claim 15, additionally including an extension bar engageable with said detecting face.

18. A set of devices as defined in claim 17, wherein said extension bar has an offset end providing a contacting configuration on an end thereof coplanar with said detecting face when said extension bar bears against said detecting face.

19. A system for taking measurements, comprising:

a plate having a grid pattern formed by mutually perpendicular groups of equally spaced parallel grooves of common width, each of said grooves providing a reference wall on the same side within each of said groups;

a bar having a key at one edge thereof adapted to closely engage said grooves, said bar having a width equal to the spacing of said grooves; and indicator means adapted to register the distance between a selected position on said plate and said bar.

* * * * *

UNITED STATES PATENT AND TRADEMARK OFFICE
CERTIFICATE OF CORRECTION

PATENT NO. : 4,868,994

DATED : 09/26/89

INVENTOR(S) : KENT H. PRICE

It is certified that error appears in the above-identified patent and that said Letters Patent is hereby corrected as shown below:

On the title page:
The inventor's name "Pirce" should be --Price--;

In column 1, line 46, delete "an" and insert --and--;

Signed and Sealed this

First Day of January, 1991

Attest:

HARRY F. MANBECK, JR.

*Attesting Officer*　　　*Commissioner of Patents and Trademarks*